United States Patent
Torrey et al.

(10) Patent No.: US 7,471,638 B2
(45) Date of Patent: Dec. 30, 2008

(54) TESTING FOR A MISCONNECTION BETWEEN FIRST AND SECOND NETWORKS

(75) Inventors: William W. Torrey, Greeley, CO (US); Jeffrey DiCorpo, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 10/961,265

(22) Filed: Oct. 8, 2004

(65) Prior Publication Data

US 2006/0077901 A1 Apr. 13, 2006

(51) Int. Cl.
*H04L 12/26* (2006.01)
*H04L 12/28* (2006.01)
*G06F 3/00* (2006.01)

(52) U.S. Cl. .................. 370/248; 370/255; 726/12

(58) Field of Classification Search .......... 370/248, 370/252, 253, 254–258; 726/2–27
See application file for complete search history.

(56) References Cited

U.S. PATENT DOCUMENTS

| | | | |
|---|---|---|---|
| 6,560,203 B1 * | 5/2003 | Beser et al. | 370/252 |
| 6,657,991 B1 * | 12/2003 | Akgun et al. | 370/352 |
| 6,807,156 B1 * | 10/2004 | Veres et al. | 370/252 |
| 6,807,184 B2 * | 10/2004 | Gutknecht et al. | 370/401 |
| 7,032,034 B1 * | 4/2006 | Tenneti et al. | 709/249 |
| 2002/0138614 A1 * | 9/2002 | Hall | 709/225 |
| 2003/0069947 A1 | 4/2003 | Lipinski | |
| 2004/0066747 A1 * | 4/2004 | Jorgensen et al. | 370/241 |
| 2005/0021855 A1 * | 1/2005 | Wang et al. | 709/245 |
| 2006/0067241 A1 * | 3/2006 | Lorentzen et al. | 370/252 |
| 2007/0115845 A1 * | 5/2007 | Hochwarth et al. | 370/252 |

OTHER PUBLICATIONS

R. Droms, Network Working Group, Request for Comments 1541, "Dynamic Host Configuration Protocol," pp. 1-37 (Oct. 1993).
R. Droms, Network Working Group, Request for Comments 2131, "Dynamic Host Configuration Protocol," pp. 1-43 (Mar. 1997).
J. Wobus, "DHCP FAQ," DHCP Handbook, pp. 1-24 (Oct. 1998).

* cited by examiner

*Primary Examiner*—Chi H. Pham
*Assistant Examiner*—Tri H. Phan

(57) ABSTRACT

An apparatus to test whether a first network is misconnected to a second network includes an interface to the first network, and a controller coupled to the interface to send a first message to the first network, the first message to request configuration information of the apparatus. The controller receives a second message from a configuration server coupled to the second network, the second message being responsive to the first message. The controller indicates misconnection of the first network to the second network in response to receiving the second message.

25 Claims, 3 Drawing Sheets

TESTING FOR A MISCONNECTION BETWEEN FIRST AND SECOND NETWORKS

BACKGROUND

To shield information and activities of some networks from public view, such networks are implemented as private networks. Private networks can be used in organizations such as companies, research institutions, educational institutions, and so forth. Usually, a router or gateway is provided between the private network and a more public network, such as the Internet or some other network with greater accessibility by users than the private network. The router or gateway contains elements to provide security features that prevent entities on the more public network from gaining unauthorized access to resources and information on the private network.

Before a network device can communicate on a network (private network or public network), the network device is typically configured by a configuration server, such as a Dynamic Host Configuration Protocol (DHCP) server. In response to a request from the network device, the DHCP server provides configuration information to the network device, including the network address of the network device, resources that the network device has access to, and so forth. DHCP permits dynamic assignment of configuration information to network devices.

A gateway or router that provides the interface between a private and a public network often has multiple ports to connect to multiple networks. For example, the gateway or router may have multiple ports that are connected to a private network side, and one or more ports connected to the public network side. A common mistake that is made by network administrators or other users when installing gateways or routers is that both the private network and public network are connected to ports on the same side of the gateway or router (either the private network side or the public network side).

Usually a DHCP server is provided on a private network, and a separate DHCP server is provided on a public network. If the private and public networks are misconnected to ports on the same side of the gateway or router, then network devices on the private network may be able to access the DHCP server on the public network. Similarly, as a result of the misconnection, network devices on the public network may also have access to the DHCP server on the private network. Consequently, when a private network device sends a request for configuration information, the response may come from the DHCP server on the public network, rather than the DHCP server on the private network. The reverse may also be true, for example when a public network device receives configuration information from a DHCP server on the private network.

In most cases, the network addresses that are assigned to network devices on the private network are different from network addresses assigned to network devices on the public network. If the private network subnet is different from the public network subnet, then a private network device that is configured by a public network DHCP server may not be able to establish proper connectivity with the private network during normal operation. A subnet refers to a network that has a predefined range of network addresses.

Often, the misconnection of different networks at the ports of a gateway or router is not noticed until after setup of the gateway or router, and after users complain that they are having problems accessing the network.

DETAILED DESCRIPTION

Figure 1:
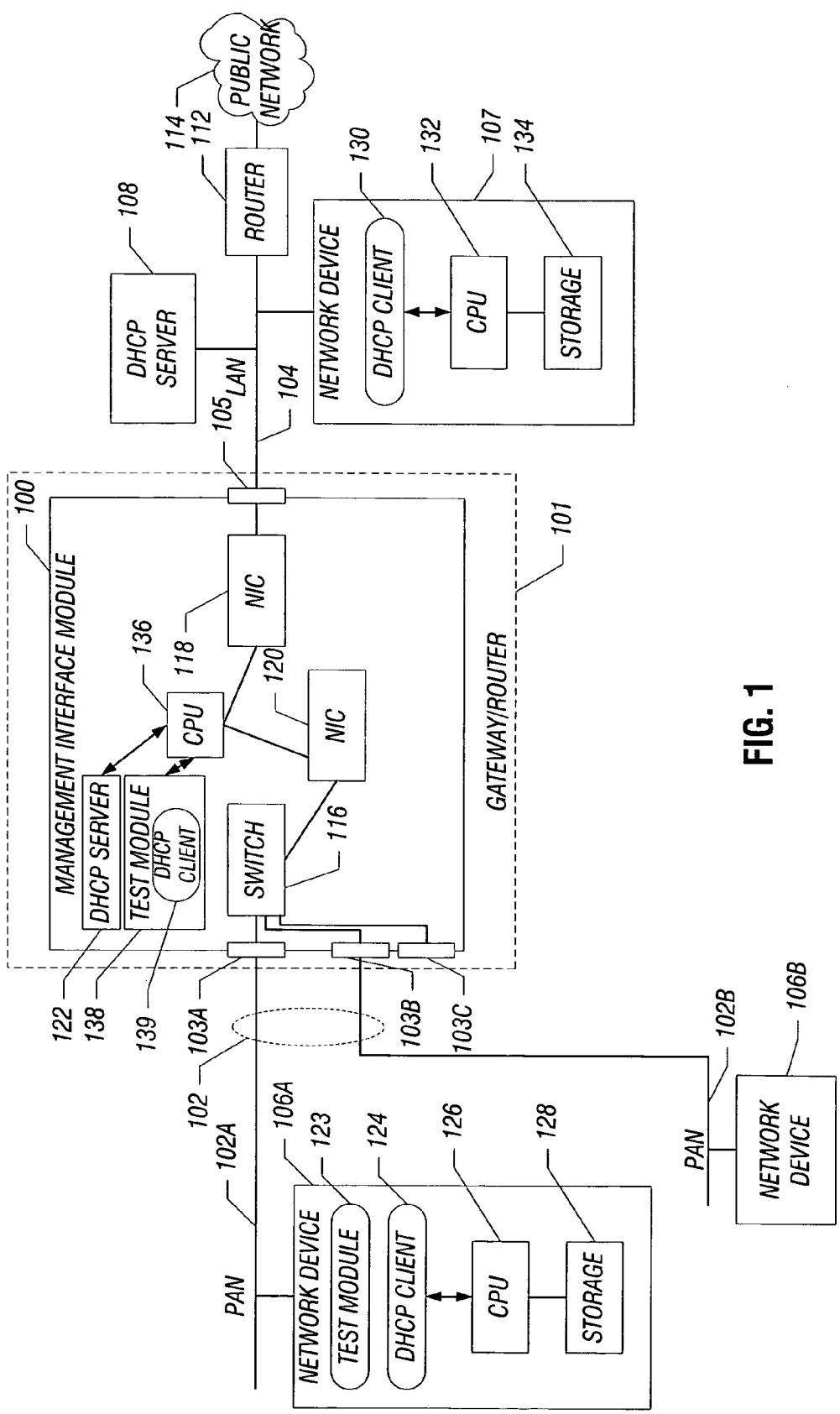
FIG. 1 is a block diagram of an example network arrangement that includes a management interface module (provided in a gateway or router) according to an embodiment of the invention.

In FIG. 1, a network device 106A is coupled over a private network link 102A to a port 103A of a management interface module 100. A second network device 106B is coupled over a private network link 102B to a second port 103B of the management interface module 100. The management interface module 100 also includes one or more other ports 103C for connection to other network devices over a private network link. Collectively, the network links 102A, 102B, and other private network links are referred to as a private area network (PAN) or a private network 102. A "private area network" or "private network" refers to a network whose resources and information are hidden from view from unauthorized users or network devices on another network. The private network uses network addresses in a private network address space rather than a public network address space.

The management interface module 100 is part of a gateway or router 101 that allows inter-communication between network devices on the private area network and network devices on another network, such as a local area network (LAN) 104. The local area network 104 is connected to a port 105 of the management interface module 100. Although only one port 105 for connection to a local area network is shown, the management interface module 100 can include additional ports for connection to other local area networks. The term "local area network" or "local network" refers to any network that is distinct from the private area network on the other side of the management interface module 100. The local area network 104 is a computer network that covers a relatively small area. The local area network 104 can sit behind a router 112 to isolate the local area network 104 from a public network 114.

In one example, the public network 114 is the Internet. The local area network 104 can be the general access network within some organization, such as a company, research institution, education institution, and so forth. For example, the local area network 104 can be accessible to all or most users of the organization. For enhanced security, the private network 102 can be a restricted access network that only a limited set of users have access to.

One or more network devices 107 can be connected to the local area network 104. Also depicted in FIG. 1 is a Dynamic Host Configuration Protocol (DHCP) server 108 that is connected to the local area network 104. The DHCP server 108 is also referred to as a LAN DHCP. The LAN DHCP server 108 permits dynamic assignment of configuration information to network devices connected to the local area network 104. DHCP is described in Request for Comments (RFC) 1541, entitled "Dynamic Host Configuration Protocol," dated October 1993. DHCP is a protocol for assigning dynamic network addresses, and other configuration information, to devices on a network. When a network device 107 on the local area network 104 first starts up, the network device 107 sends requests to the DHCP server 108 to obtain configuration information. The DHCP server 108, in response to such a request, sends a response containing the configuration information, including the network address of the network device 107, back to the network device 107. In one example implementation, the network address used by the network device 107 (as well as the network devices 106A, 106B on the private area network 102) are Internet Protocol (IP) addresses. IP enables packet-switched communications over a network. Versions of IP are described in RFC 791, entitled "Internet Protocol," dated September 1981; and RFC 2460, entitled "Internet Protocol, Version 6 (IPv6) Specification," dated December 1998.

The private area network 102 is also associated with a DHCP server 122 (also referred to as a PAN DHCP) that is included in the management interface module 100. In a different embodiment, the PAN DHCP server 122 may be a separate element that is distinct from the management interface module 100. In yet another embodiment, both the PAN DHCP server 122 and LAN DHCP server 108 may be included within the management interface module 100.

In the management interface module 100, the DHCP server 122 is a software module executable on a central processing unit (CPU) 136 of the management interface module 100. Alternatively, the DHCP server 122 can be in a separate platform, such as the DHCP server 108 depicted in FIG. 1.

The PAN DHCP server 122 in the management interface module 100 is normally accessible by the network devices 106A, 106B coupled over private network links 102A, 102B to the management interface module 100. If the private area network 102 and local area network 104 are properly connected to ports of the management interface module 100, then network devices 106A, 106B on the private area network 102 would not be able to access the LAN DHCP server 108 on the local area network. Similarly, with proper connections of the networks 102, 104 to the ports of the management interface module 100, the network device(s) 107 on the local area network 104 would not be able access the PAN DHCP server 122.

However, when installing the management interface module 100 and connecting the management interface module 100 to the private area network 102 and local area network 104, a user may incorrectly connect the local area network 104 to the port 103C (on the private area network side of the management interface module 100) instead of the port 105 (on the local area network side of the management interface module 100). Another type of misconnection is when both the private area network 102 and local area network 104 are connected to the local area network side of the management interface module 100. If misconnection occurs, the network devices 106A, 106B on the private area network will have access to the LAN DHCP server 108, and the network device(s) 107 on the local area network 104 will have access to the PAN DHCP 122.

As used here, the term "misconnection" (or alternatively, "mis-wiring") refers to the improper connection of two different networks to an interface node, such as a gateway or router, such that the intended isolation of the two networks is not available. Some embodiments of the invention can also detect other types of misconnections or mis-wirings between different networks. Generally, an interface node has at least two sides: a first network side for connection to a first network, and a second network side for connection to a second network. The interface node provides isolation between the first and second networks, such that certain resources or information on the first network are not accessible by network devices on the second network. A gateway is a node on a network that serves as an entrance to another network. A router is a device that forwards data packets along networks. In the ensuing discussion, although reference is made to just a "gateway," it is contemplated that some embodiments of the invention can be applied with a router or other interface node between or among multiple networks. The term "gateway" is thus intended to cover a gateway, router, or any other interface node between multiple networks.

According to some embodiments of the invention, to quickly determine if a misconnection has been made at the management interface module 100 in the gateway 101, a test module 138 is provided in the management interface module 100 for testing port connections of the private area network 102 and local area network 104 to ports of the management interface module 100. The test module 138 includes a DHCP client 139 to enable communication with a DHCP server for test purposes. In an alternative embodiment, one of the network devices 106A, 106B, and 107 can be configured to include a test apparatus for testing the private area network and local area network connections. For example, as depicted in FIG. 1, the network device 106A can be configured as the test apparatus. In such a configuration, the network device 106A includes a test module 123, a DHCP client 124 (which interacts with a DHCP server), a central processing unit (CPU) 126, and a storage 128. The test module 123 and DHCP client 124 are software modules executable on the CPU 126. In a different embodiment, the test module 123 and/or DHCP client 124 can be implemented in hardware, or a combination of hardware and software.

The combination of the test module 138 and DHCP client 139 or the combination of the test module 123 and DHCP client 124 is referred to as a "test apparatus." The test apparatus (138, 139 in management interface module or 123, 124 in the PAN network device 106A) on the private area network side is executable to detect for presence of the LAN DHCP server 108 on the local area network 104. In response to detection of the presence of the LAN DHCP server 108, the test apparatus indicates a misconnection has occurred, since the test apparatus on the private area network side is not supposed to be able to receive any response or message from the LAN DHCP server 108.

In a different implementation, the test apparatus can be provided in the LAN network device 107. In this case, the test apparatus in the LAN network device 107 can indicate misconnection based on whether or not the test apparatus detects the presence of the PAN DHCP server 122. Using the test apparatus according to some embodiments of the invention, a network administrator or other user can quickly ascertain, at the time of installing and configuring the management interface module 100, whether misconnection to ports of the management interface module 100 has occurred. The test apparatus includes software module(s) that can be conveniently loaded into any of the network devices or the management interface module 100 to perform a quick test of the network connections to the management interface module 100.

Although reference is made to DHCP in the described embodiments, it is noted that other protocols can be used in other embodiments for the purpose of a network device being able to obtain configuration information. More generally, a test apparatus (located on a first network) is able to send a request for configuration information onto the first network. If misconnection of the first network and second network at a gateway has occurred, then the request for configuration information will be received by a configuration server located on the second network. The second network configuration server will then respond to the request. The test apparatus will detect this response and indicate that misconnection has occurred, since the test apparatus was not expecting a response from the second network configuration server.

As further shown in FIG. 1, the network device 107 also includes a DHCP client 130, a CPU 132 and a storage 134 (and optionally, a test module, not shown in FIG. 1). The management interface module 100 further includes a switch 116 connected to the private area network ports 103A, 103B, 103C. The switch 116 is connected to network interface card (NIC) 120, which is also connected to the CPU 136. The CPU 136 communicates with devices on the private area network side through NIC 120 and switch 116. The CPU 136 is also connected to a second network interface card 118 to communicate with devices on the local area network 104. Although reference is made to a network interface card in one implementation, it is noted that other types of network interfaces can be used in other embodiments.

Routing of data packets communicated through the management interface module 100 is performed using a network stack (not shown) running on the CPU 136. Routing of packets is based on addresses carried within the packets. For example, IP packets contain an IP header that includes a source IP address (to identify the originating network device of a packet) and a destination IP address (to identify the destination network device of the packet). A packet originated by a network device on the private area network side that contains a destination address of a network device on the local area network side is routed by the CPU 136 from the private area network 102 to the local area network 104. The gateway 101 may include a network address translation (NAT) module (not shown) to translate between PAN network addresses and LAN network addresses whenever a packet is communicated between the private area network 102 and local area network 104.

A packet originated by a network device on the private area network side intended for another network device on the private area network side is routed by the switch 116 to the other network device on the private area network side.

Figure 2:
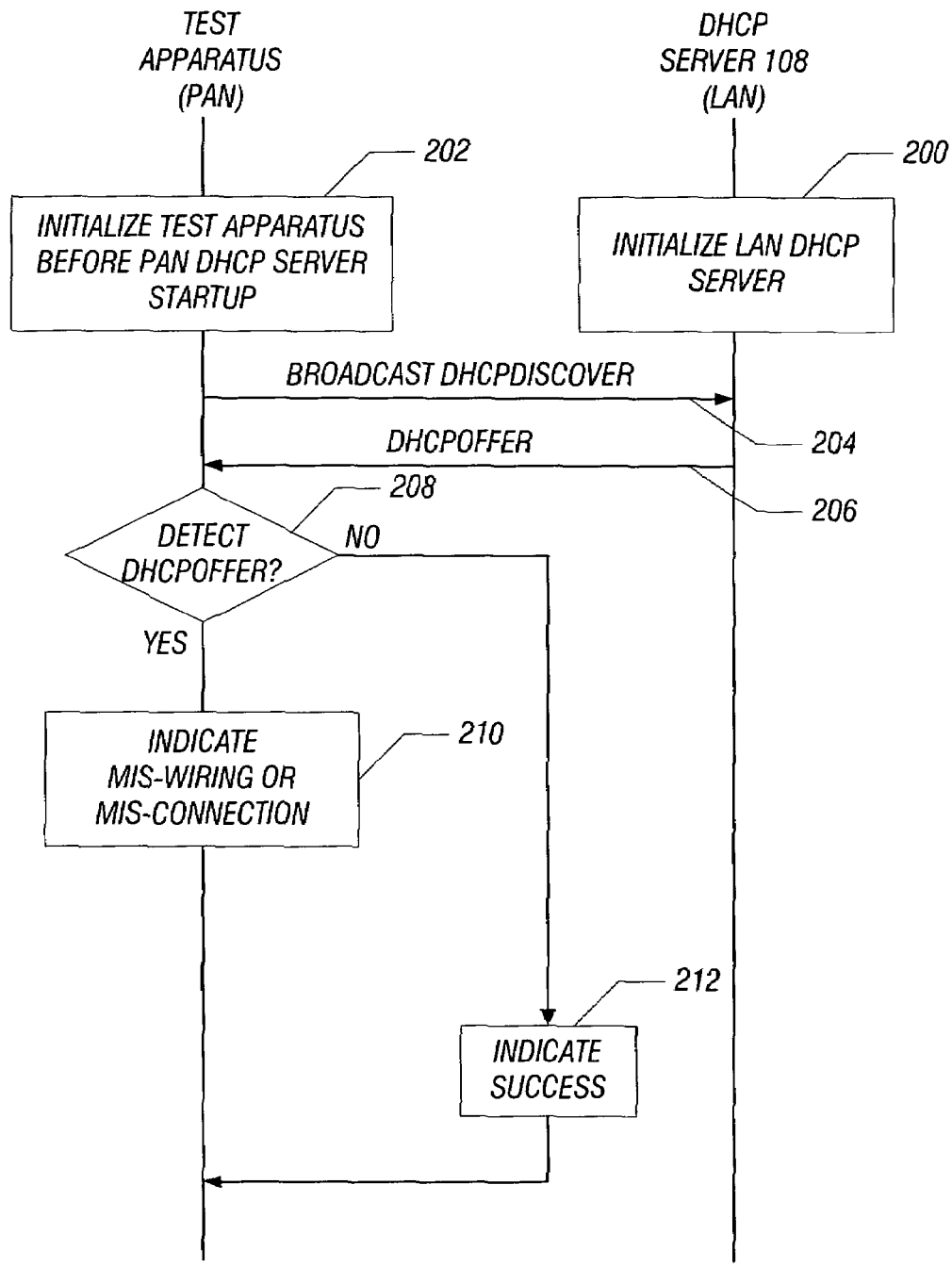
FIGS. 2 and 3 are flow diagrams to illustrate test processes for testing network connections to the management interface module, according to some embodiments of the invention.

FIG. 2 illustrates a flow diagram of testing for misconnection of the management interface module 100 according to one embodiment. In the embodiment of FIG. 2, it is assumed that the LAN DHCP server 108 is started up and initialized (at 200), but the PAN DHCP server 122 is not started up. After initialization of the LAN DHCP server at 200, a test apparatus on the private area network, such as test apparatus in management interface module 100 (FIG. 1) or in network device 106A, is initialized (at 202). The test apparatus on the private area network is initialized before start-up of the PAN DHCP server 122. The DHCP client in the test apparatus sends a broadcast DHCPDISCOVER message (204) to the private area network 102. If the private area network and local area network are properly connected to the management interface module 100, then a response would not be expected since the PAN DHCP server 122 has not yet started. The DHCPDISCOVER message is a message issued by a DHCP client to locate DHCP servers on a network. Effectively, this message is a request for configuration information. If a DHCP server is present, then the DHCP server would provide a response.

In the example of FIG. 2, the local area network 104 is misconnected to a PAN port (such as port 103C in FIG. 1) of the management interface module 100. As a result of this misconnection, the DHCPDISCOVER message sent by the DHCP client will be received by the LAN DHCP server 108. In response, the DHCP server 108 sends (at 206) a DHCPOFFER message that contains configuration parameters for the DHCP client.

The test module in the test apparatus detects (at 208) whether a DHCPOFFER message is received. If so, then the test module indicates (at 210) mis-wiring or misconnection of the networks to the management interface module 100. Indication of failure (mis-wiring or misconnection) can be performed a number of different ways. The indication of failure can be as simple as a message (visual or audio message) presented by an output device (display or speaker) of the network device 106A or management interface module 100. The message can be a failure message. Alternatively, the message can be some indication that configuration has successfully occurred when in fact the expectation is that the configuration should have failed.

If the test module does not detect a received DHCPOFFER message (at 208), then the test module indicates success (at 212), which effectively indicates that the networks have been properly connected to ports of the management interface module 100.

Figure 3:
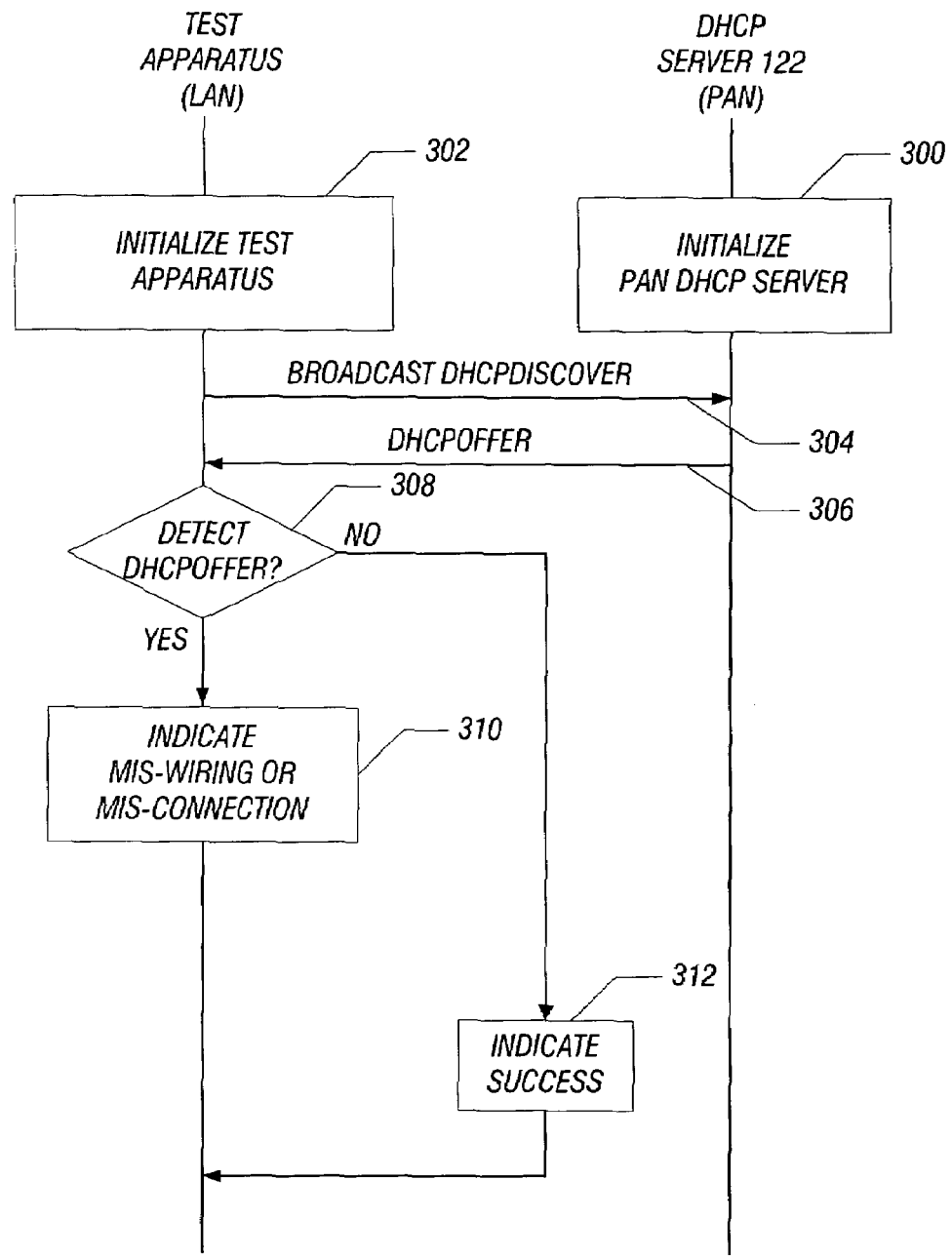

In FIG. 3, according to a different embodiment, the LAN DHCP server 108 is not started (or does not exist). In this case, the PAN DHCP server 122 is started and initialized (at 300). Next, after initialization of the PAN DHCP server 122, a test apparatus (including a test module and DHCP client 130 in the network device 107 of FIG. 1) on the local area network is initialized (at 302). The DHCP client 130 then sends (at 304) a broadcast DHCPDISCOVER message to the local area network 104. Since the LAN DHCP server 108 was not started, the DHCP client 130 should not receive a response to the broadcast DHCPDISCOVER message. However, since the local area network 104 has been misconnected to a PAN port of the management interface module 100, the PAN DHCP server 122 actually receives the broadcast DHCPDISCOVER message. In response, the PAN DHCP server 122 sends (at 306) a DHCPOFFER message to the network device 107. The test module in the network device 107 then performs acts 308, 310 and 312, which are the same as acts 208, 210 and 212 respectively, in FIG. 2, to determine whether mis-wiring or misconnection has occurred. Mis-wiring or misconnection is indicated in response to the test module in the network device 107 detecting receipt of the DHCPOFFER message from the PAN DHCP server 122.

In this manner, a flexible and convenient mechanism is provided to determine whether networks have been properly connected to ports of a management interface module 100. The technique described herein allows early detection of such misconnection.

Instructions of the various software routines or modules discussed herein (such as the test module, DHCP client, and other software components) are executed on corresponding CPUs. The CPUs include microprocessors, microcontrollers, processor modules or subsystems (including one or more microprocessors or microcontrollers), or other control or computing devices. As used here, a "control module" refers to hardware, software, or a combination thereof. A "control module" can refer to a single component or to plural components (whether software or hardware).

Data and instructions (of the various software routines or modules) are stored on one or more machine-readable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The flow diagrams descried above for software modules and routines show exemplary blocks. Additions, deletions, and alternations of the acts or sequence shown are contemplated for some embodiments.

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An apparatus to test whether a first network is misconnected to a second network, comprising:
    an interface to the first network; and
    a control module coupled to the interface to:
       send a first message to the first network, the first message to request configuration information including a network address of the apparatus,
       if the second network is misconnected to a port of a gateway between the first and second networks, receive a second message from a configuration server connected to the second network, the second message being responsive to the first message; and
       indicate misconnection of the first network to the second network in response to receiving the second message.

2. The apparatus of claim 1, wherein the control module is adapted to send the first message to the first network on which a configuration server either does not exist or has not been started.

3. The apparatus of claim 2, wherein the control module is adapted to receive the second message from the second network that should be isolated from the first network by the gateway.

4. The apparatus of claim 1, wherein the first message and second message comprise Dynamic Host Configuration Protocol (DHCP) messages, and the configuration server comprises a DHCP server, wherein the second DHCP message responsive to the first DHCP message is received from the DHCP server connected to the second network if the second network is misconnected to the port of the gateway.

5. The apparatus of claim 4, wherein the first DHCP message comprises a DHCPDISCOVER message, and the second DHCP message comprises a DHCPOFFER message, wherein indicating the misconnection of the first network to the second network is in response to receiving the DHCPOFFER message from the DHCP server connected to the second network.

6. The apparatus of claim 4, wherein the control module comprises a DHCP client.

7. The apparatus of claim 6, wherein the control module further comprises a test module to determine if the second DHCP message has been received from the DHCP server and to indicate the misconnection in response to determining that the second DHCP message has been received from the DHCP server.

8. The apparatus of claim 1, wherein the control module is to not receive the second message from the configuration server connected to the second network if the second network is properly connected to another port of the gateway.

9. A method of resting for misconnection between a first network and a second network at a gateway coupling the first and second networks, comprising:
    sending, from a test apparatus, a first message seeking configuration information from a configuration server, the first message sent to the first network;
    determining, by the test apparatus, whether a second message has been received from a configuration server on the second network in response to the first message, wherein the second message is received if the second network is misconnected to a port of a gateway between the first and second networks, wherein the second message is not received if the second network is properly connected to another port of the gateway; and
    indicating, by the test apparatus, whether misconnection between the first and second networks has occurred in response to determining whether the second message has been received from the configuration server on the second network.

10. The method of claim 9, wherein sending the first message comprises sending a Dynamic Host Configuration Protocol (DHCP) message seeking configuration information from a DHCP server.

11. The method of claim 10, wherein sending the first message comprises sending a DHCPDISCOVER message, and wherein determining whether the second message has been received comprises determining whether a DHCPOFFER message has been received from the DHCP server.

12. The method of claim 9, further comprising indicating misconnection has occurred in response to determining that the second message has been received from the configuration server.

13. The method of claim 12, further comprising indicating proper connection of the first and second networks in response to determining that the second message has not been received from the configuration server.

14. The method of claim 9, wherein the first and second networks are coupled to ports of an interface module in the gateway having a first network side and a second network side, the method further comprising receiving the second message from the configuration server in response to both the first and second networks connected to ports on the first network side of the interface module or both the first and second networks connected to ports on the second network side of the interface module.

15. The method of claim 14, wherein the sending, determining, and indicating are performed by the test apparatus that is part of the interface module.

16. The method of claim 14, wherein the sending, determining, and indicating are performed by the test apparatus that is part of a network device located on the first network.

17. An article comprising at least one machine-readable storage medium containing software instructions that when executed cause a test apparatus to:
    perform a Dynamic Host Configuration Protocol (DHCP) procedure on a first network; and
    determine whether the first network is misconnected to a second network based on a result of the DHCP procedure,
    wherein performing the DHCP procedure comprises:

sending a first DHCP message on the first network;
determining whether a second DHCP message is received from a DHCP server on the second network, wherein the second DHCP message is received if the second network is misconnected to a port of a gateway between the first and second networks, wherein the second DHCP message is not received if the second network is properly connected to another port of the gateway,
wherein determining whether the first network is misconnected to the second network is in response to determining whether the second DHCP message has been received from the DHCP server.

18. The article of claim 17, wherein the instructions when executed cause the test apparatus to indicate that the first network is misconnected to the second network in response to receiving the second DHCP message from the DHCP server on the second network.

19. The article of claim 18, wherein the instructions when executed cause the test apparatus to indicate that the first network and second network are properly connected in response to determining that the second DHCP message has not been received from the DHCP server in response to the first DHCP message.

20. The article of claim 17, wherein performing the DHCP procedure comprises:
sending a DHCPDISCOVER message on the first network, the first DHCP message being the DHCPDISCOVER message,
wherein determining whether the first network is misconnected to the second network is based on whether a DHCPOFFER message is received from the DHCP server on the second network, wherein the second DHCP message is the DHCPOFFER message.

21. A system comprising:
first and second networks;
a gateway coupled between the first and second networks;
a configuration server connected to the second network; and
a test apparatus connected to the first network to:
send a first message to the first network, the first message to seek configuration information including a network address of the test apparatus;
if the second network is misconnected to a port of a gateway between the first and second networks, receive a second message from the configuration server connected to the second network; and
indicate misconnection of the first and second networks in response to receiving the second message.

22. The system of claim 21, wherein the configuration server comprises a Dynamic Host Configuration Protocol (DHCP) server.

23. The system of claim 22, wherein the second message comprises a DHCPOFFER message, the test apparatus to indicate misconnection of the first and second networks in response to receiving the DHCPOFFER message.

24. The system of claim 23, wherein the test apparatus comprises a DHCP client and a test module to detect the second message and to indicate misconnection of the first and second networks.

25. The system of claim 21, wherein the test apparatus is to not receive the second message from the configuration server connected to the second network if the second network is properly connected to another port of the gateway.

* * * * *

UNITED STATES PATENT AND TRADEMARK OFFICE
CERTIFICATE OF CORRECTION

PATENT NO.         : 7,471,638 B2                                   Page 1 of 1
APPLICATION NO. : 10/961265
DATED              : December 30, 2008
INVENTOR(S)        : William W. Torrey et al.

It is certified that error appears in the above-identified patent and that said Letters Patent is hereby corrected as shown below:

In column 8, line 8, in Claim 9, delete "resting" and insert -- testing --, therefor.

Signed and Sealed this

Sixth Day of October, 2009

David J. Kappos
*Director of the United States Patent and Trademark Office*